United States Patent [19]

Neese

[11] Patent Number: 4,707,152
[45] Date of Patent: Nov. 17, 1987

[54] CAGE FOR TAPERED ROLLER BEARINGS
[75] Inventor: Gerhard Neese, Gressthal, Fed. Rep. of Germany
[73] Assignee: FAG Kugelfischer Georg Schafer (KGaA), Fed. Rep. of Germany
[21] Appl. No.: 4,659
[22] Filed: Jan. 20, 1987
[30] Foreign Application Priority Data Feb. 22, 1986 [DE] Fed. Rep. of Germany ....... 3605812

[51] Int. Cl.⁴ ........................ F16C 33/46; F16C 33/56
[52] U.S. Cl. .................................... 384/572; 384/576; 384/580
[58] Field of Search ............... 384/560, 571, 572, 573, 384/575, 576, 580

[56] References Cited

U.S. PATENT DOCUMENTS 4,288,129 9/1981 Ryanen .............................. 384/576
4,541,743 9/1985 Hatano ........................... 384/572 X
4,629,339 12/1986 Moringa .............................. 384/576

FOREIGN PATENT DOCUMENTS 50224 3/1984 Japan .................................. 384/576
2115889 9/1983 United Kingdom ................ 384/576

Primary Examiner—Stuart S. Levy
Assistant Examiner—Thomas R. Hannon
Attorney, Agent, or Firm—Ostrolenk, Faber, Gerb & Soffen

[57] ABSTRACT

A cage for a tapered roller bearing includes a small diameter ring, a large diameter ring and circumferentially spaced arms joining the rings and defining pockets for the tapered rollers. The inwardly facing opposite surfaces of the arms in a pocket including an axial region adjoining the large diameter ring, which is also radially outside of the mold parting line developed during the formation of the cage. Those surfaces of the arms in the region adjoining the large side ring of the cage are shaped to the roller within the packet. In each cylindrical sectional plane through the bearing, which also passes through each of the rollers and is parallel to the axis of the bearing, the distance apart of the surfaces of the arms is approximately the length of a chord of the largest diameter of the roller in that cylindrical sectional plane. The large diameter ring of the cage has a radially inwardly directed projection which extends outside the lip on the bearing inner ring and a surface of the inner ring facing the projection is obliquely inclined outwardly moving radially inwardly from the large diameter ring.

13 Claims, 3 Drawing Figures

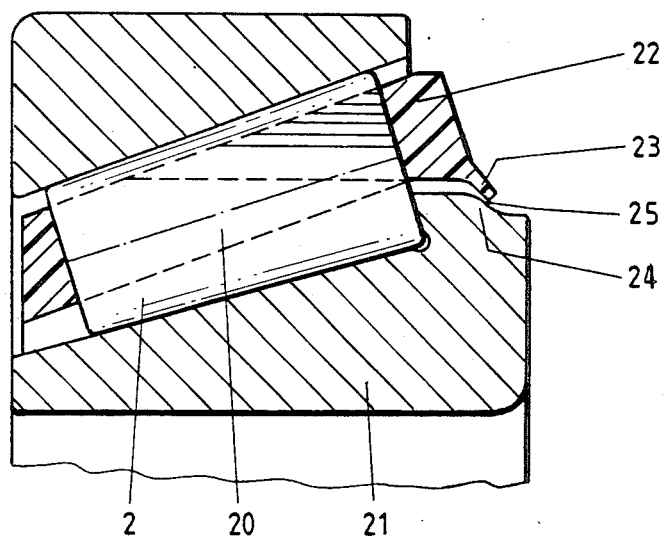

CAGE FOR TAPERED ROLLER BEARINGS

BACKGROUND OF THE INVENTION

The present invention refers to a cage for a tapered roller bearing.

A pocket cage of a bearing has axially opposite side rings, and axially extending, circumferentially spaced apart arms joining the rings. Cages for tapered roller bearings of this type having two annular, axially opposite end side rings, which side rings are of different diameter and do not intersect axially, are known, for instance, from U.S. Pat. No. 4,288,129. The pocket openings in these cages are bordered by arms having surfaces intended to separate and space the rollers and prevent their skewing excessively. The pockets are formed using axially moved pushers. In U.S. Pat. No. 4,288,129, the pusher lying radially inside the mold parting line of the cage is pulled out in the axial direction which is away from the small side ring and toward the larger side ring. Radially inside the mold parting line, the pocket surfaces in the arms of the cage, which surfaces are produced by the pusher being pulled out, can be completely adapted to the profile of the roller due to the widening profile of the roller in that axial direction. But, this shaping of the pocket surfaces is not possible in that region of the cage that lies radially outside of the mold parting line because the second pusher which is extractable, here in the axially opposite direction from the first pusher, makes necessary the provision of pocket surfaces which are spaced from the roller outer surfaces and the position of which is determined by the largest roller diameter. For the sake of simplicity, these pocket surfaces, arranged in each case on one arm of the cage, are parallel to each other. In the pocket regions lying radially outside the mold parting line, no pocket sections which engage behind the rollers are able to be present. In the case of certain size relationships, this can lead to cages which, in the region of the large side ring of the cage, have only relatively short axial length sections which grip the rollers. Of course, they are still gripped near the small side ring. However, this can still lead to the rollers no longer being gripped sufficiently and, in particular, to the rollers falling out of the cage upon assembly of the bearing. Although these roller gripping sections near the small side ring can be lengthened by locating the mold parting line radially further toward the outside, since the location of the parting line also determines the location of the inside of the large side ring, in that case the large side ring will be so weakened in its cross section that the stability of the cage will be considerably reduced.

SUMMARY OF THE INVENTION

It is therefore the object of the present invention to improve a cage for tapered roller bearings.

It is another object of the invention to provide support for the rollers over a greater axial length, and particularly near the large diameter side ring of the cage.

A further object of the invention is to improve such a cage formed using axial pushers.

The invention concerns an improved cage for a tapered roller bearing, which cage is typically formed in a process wherein two axial pushers are removed axially from the cage, as described above, which defines a mold parting line in the cage, which mold parting line is parallel to the axis of the cage and of the bearing.

The cage has a smaller radius side ring and a larger radius side ring, and circumferentially spaced arms which join the rings and define between the arms pockets for the rollers. The neighboring arms defining a pocket for a roller have respective opposite inwardly facing surfaces. In the axial region of at least one and preferably both of the arms which adjoins the large side ring of the cage, and usually adjoins the larger diameter end of the rollers, which region is also the region radially outside the mold parting line, the surfaces of the arms are generally adapted to the profile of the roller, which was not easily accomplished in prior art cages formed by axial pushers.

To adapt the cage pocket surfaces to the tapered roller profile, in every cylindrical sectional plane parallel to the axis of the bearing, that is a cylindrically shaped plane or surface extending completely around the bearing, at a specific radius which is greater than the radius of the mold parting line, the facing arm surfaces in the pocket are a distance apart which, in that same cylindrical sectional plane, is approximately the length of a chord through the largest diameter of the tapered roller in the same plane. That largest diameter typically is at the large side ring. For successive radially outward cylindrical sectional planes, the length of a chord of the roller at its largest diameter gradually diminishes, whereby the distance between the surfaces of the arms in successively outward planes also gradually diminishes, causing the pocket surfaces to have respective profiles generally adapted to the profile of the roller, thereby providing guidance to the rollers.

At least in individual sections, the arms of the cage grip behind the respective rollers also in the region of the large side ring, which ring turn also has a large cross section, so as to obtain a single structural unit.

In the tapered roller bearing according to the invention, the inner ring has a lip, rim or flange at the axially outward end of all of the rollers. The larger diameter side ring of the cage includes approximately radially inwardly directed projections which extend radially inwardly a short distance of the large side ring and axially outward of the lip on the inner ring. This assures that a complete unit between inner ring, cage and rollers is obtained, even if no small holding rim, lip or flange is provided on the bearing inner ring.

In a more preferred embodiment, the axially outward surface of the lip on the inner ring which is in the region of the large side ring of the cage is obliquely inclined, axially outward radially inwardly of the large diameter ring, generally defining a slot into which the projection from the large diameter side ring extends, and that orientation of the projection and the inclined surface or slot in the lip of the inner ring tends to redirect lubrication into the bearing.

The invention produces pocket surfaces which lie opposite each other at least in the region of the large ends of the rollers. These pocket surfaces grip far around the rollers in this region. The danger of the rollers falling out is therefore eliminated since a cage which has been developed in the manner described has adequate holding projections within the regions of both ends of the rollers. Furthermore, the cage has a side ring of large cross section in the region of the large end surface of the roller. This increases the stability of the cage, and radial guidance of the cage can be effected on the rim, lip or flange of the inner bearing ring also on this side.

BRIEF DESCRIPTION OF THE DRAWINGS

Other objects and features of the invention are described with reference to the drawings in which:

FIG. 3 shows a variant of the tapered roller bearing of FIG. 1.

DESCRIPTION OF THE PREFERRED EMBODIMENT

Figure 1:
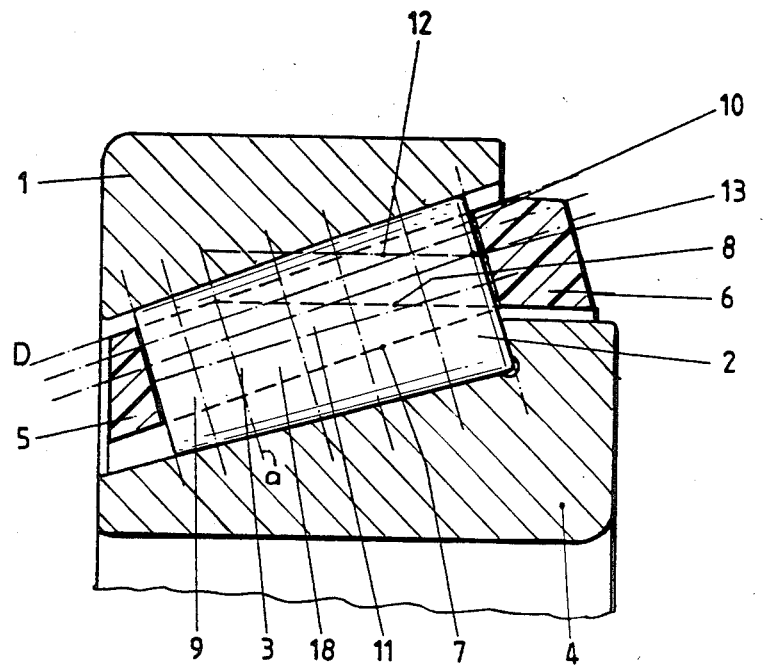
FIG. 1 is a partial section through a tapered roller bearing according to the invention.

Referring to FIG. 1, a tapered rolling bearing comprises the outer ring 1 having an inwardly facing race, the rollers 2 between the ring races, the cage 3 around and spacing the rollers, and the inner ring 4 having an outwardly facing race.

The cage 3 is of a molded material and may be of a plastic or polyamide of sufficient hardness and wear resistance. The cage is developed as a window cage with spaced pockets for receiving the rollers. The cage includes a radially smaller side ring 5, a radially larger side ring 6 and the axially extending arms 7 which join the rings 5 and 6, space them apart and define between a pocket between two neighboring arms. There are two differently shaped pocket surfaces 9 and 10 at different axial sections of the arm 7 and which face toward the rollers 2. The surfaces 9 and 10 are separated in the radial direction of the cage by the mold parting line 8 of the cage and in this manner form the pockets 11. The section plane at the end of the mold parting line and transverse to the roller separates surfaces 9 and 10.

The mold parting line 8 is produced on the cage as a result of the use of axial form-ejection tools, because in the region of the surface 9, a first axial pusher (not shown) must be pulled out to the right and in the region of the surface 10 a second axial pusher (not shown) must be pulled out to the left. Since the rollers 2 increase in diameter and cross section in the direction toward the right, the surfaces 9 outside the roller reference circle can be adapted to the roller profile.

Figure 2:
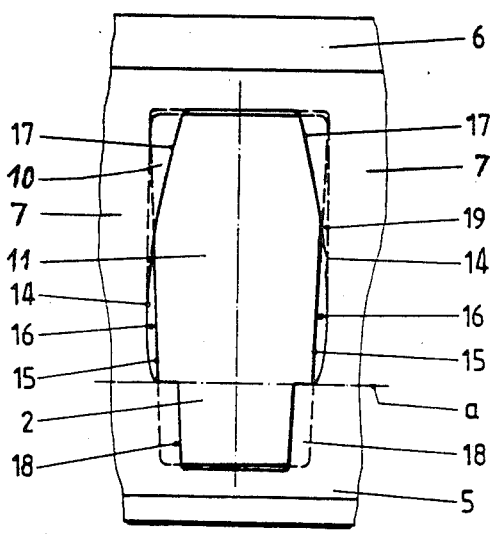
FIG. 2 is a partial top view of the cage seen in the plane D of FIG. 1.

The surface 10 axially adjacent to the large side ring 6 and radially outward of the mold parting line 8 was a flat surface in the past, as shown by the dashed line in FIG. 2. That surface was determined by the absolute largest roller diameter of the tapered roller. This was necessary since an axial pusher could not have been pulled out toward the left in FIG. 1 to be removed because of the decreasing roller diameters if there had been surfaces fitted to the roller profile. Therefore, until now no arm sections engaging behind the rollers were provided within the region of the surfaces 10 which commences in the section plane a that intersects the end of the mold parting line.

In accordance with the invention, however, it is possible to have arm sections engage behind the rollers at surface 10. Within the region of the surface 10, in all imaginary cylindrical section planes through the rollers and coaxial to the axis of the bearing, for instance the section plane 12, it is necessary that the distance apart of both arms 7 in the pocket 11 in any roller cylinder section plane parallel to the axis of the bearing be at least as great over the entire axial length of that section plane 12 as the roller chord in that same plane in the region of the largest diameter 13 of the roller 2. The chord of the roller diminishes in each plane radially further out. The chord of interest in that plane is the one that is measured in the largest diameter part, usually the wider end, of the tapered roller.

The roller 2 is not gripped around in the central region 16 since the pusher section must be brought out there, and the pusher has a width which is at least equal to that of the largest roller diameter.

Adjoining the large side ring 6 of the cage, there are arm sections 17 which are determined by the axial projection of the corresponding largest roller diameter. Since the chords become smaller and smaller radially outward, the arm spacings also become smaller, which leads to larger and larger arm sections 17, and these grip around the roller 2. Theoretically, in the region adjacent the largest roller diameter 13, this results in pocket surfaces which are almost completely adapted to the roller profile. For this reason, the roller can have only a slight play in the pocket in this region.

In the region of the small side ring there has been no change as compared with the prior art. Here the arms grip around the rollers in the region radially inside the mold parting line 8. For that reason the arms sections 18 result.

FIG. 3 shows a tapered roller bearing wherein the shape of the pocket corresponds to that shown in FIG. 1. Here, in order to obtain a combined structural unit between the cage 20, the rollers 2 and the inner ring 21, one or a plurality of obliquely inclined projections 23 are provided on the large diameter ring part 22 of the cage 20. The projections 23 engage behind an inner ring lip, flange or rim section 24 and into a slot 25 in the inner ring which slot has an inner surface that is also obliquely inclined. Since the slot 25 is inclined obliquely to the inside of the bearing, this causes the return into the bearing of the lubricant which has arrived at this place, which improves the lubricating conditions.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A cage for a tapered roller bearing, wherein the bearing comprises an outer ring, an inner ring radially inward of and spaced from the outer ring and a complement of tapered rollers disposed between the inner and the outer rings for rolling thereover with relative rotation of the rings, each tapered roller having a larger roller diameter section and a smaller roller diameter section and the roller tapering from the larger to the smaller diameter;

the cage for the bearing being a window cage with a plurality of pockets for receiving the rollers; the cage having a small side ring of smaller outer diameter; the cage having a large side ring of larger outer diameter; the cage having a plurality of arms spaced circumferentially around and joining the side rings, and neighboring ones of the arms defining respective pockets each for receiving a tapered roller; the arms which define a pocket for one of the rollers having respective surfaces opposite each other that face toward each other and toward the roller in the pocket;

at the surface of at least one of the arms in a pocket in the axial region generally adjoining the large side ring of the cage, the surface in that region being adapted to the profile of the roller in that in every cylindrically shaped sectional plane through the bearing, and therefore through the rollers of the bearing, and the sectional plane being parallel to the axis of the bearing, the surface being shaped so that the distance apart of the surfaces in the pocket is approximately the length of a chord of the roller in that cylindrical sectional plane in the region of the largest diameter of the roller.

2. A cage for a tapered roller bearing, wherein the bearing comprises an outer ring, an inner ring radially inward of and spaced from the outer ring and a complement of tapered rollers disposed between the inner and the outer rings for rolling thereover with relative rotation of the rings, each tapered roller having a larger roller diameter section and a smaller roller diameter section and the roller tapering from the larger to the smaller diameter;

the cage for the bearing being a window cage with a plurality of pockets for receiving the rollers; the cage having a small side ring of smaller outer diameter; the cage having a large side ring of larger outer diameter; the cage having a plurality of arms spaced circumferentially around and joining the side rings, and neighboring ones of the arms defining respective pockets each for receiving a tapered roller; the arms which define a pocket for one of the rollers having respective surfaces opposite each other that face toward each other and toward the roller in the pocket;

at the surface of both of the arms in a pocket in the axial region generally adjoining the large side ring of the cage, the facing surfaces in that region being adapted to the profile of the roller in that in every cylindrically shaped sectional plane through the bearing, and therefore through the rollers of the bearing, and the sectional plane being parallel to the axis of the bearing, the facing surfaces being shaped so that the distance apart of the surfaces in the pocket is approximately the length of a chord of the roller in that cylindrical sectional plane in the region of the largest diameter of the roller.

3. The cage of claim 2, wherein the cage has defined in it a mold parting line which is at one of the cylindrical sectional planes parallel to the axis of the bearing and which parallels the axis of the bearing; the axial regions of the surfaces which adjoin the larger diameter side ring being located radially outside the mold parting line.

4. The cage of claim 2, wherein the large side ring has a radially inward side and the small side ring has a radially outward side, the radially outward side of the small side ring is radially more inward than the radially more inward side of the large side ring.

5. The cage of claim 4, wherein the cage has defined in it a mold parting line which is at one of the cylindrical sectional planes parallel to the axis of the bearing and which parallels the axis of the bearing; the axial regions of the surfaces which adjoin the larger diameter side ring being located radially outside the mold parting line.

6. The cage of claim 5, wherein the radially inward side of the large side ring is at the radial location of the mold parting line.

7. The cage of claim 2, wherein in the axial region adjoining the small side ring, the arms also having opposite surfaces facing toward each other and toward the roller and the pocket and the opposite surfaces in this region adjoining the small side ring being generally shaped to conform to the shape of the roller in the pocket in the region axially adjoining the small side ring.

8. The cage of claim 7, wherein the cage has defined in it a mold parting line which is the mold parting line being at one of the cylindrical sectional planes parallel to the axis of the bearing and which parallels the axis of the bearing; the axial regions of the surfaces which adjoin the larger diameter side ring being located radially outside the mold parting line; and the surfaces of the arms in the axial region adjoining the small side ring being radially inward of the mold parting line.

9. The cage of claim 2, wherein the large side ring includes an approximately radially inwardly directed projection for extending radially inwardly over the inner ring of the bearing.

10. A tapered roller bearing, comprising an outer ring, an inner ring radially inward of and spaced from the outer ring and a complement of tapered rollers disposed between the inner and the outer rings for rolling thereover with relative rotation of the rings, each tapered roller having a larger roller diameter section and a smaller roller diameter section and the roller tapering in diameter from the larger to the smaller diameter;

a window cage for the bearing with a plurality of pockets for receiving the rollers; the cage having a small side ring of smaller outer diameter; the cage having a large side ring of larger outer diameter; the cage having a plurality of arms spaced circumferentially around and joining the side rings, and neighboring ones of the arms defining respective pockets each for receiving one of the tapered rollers; the arms which define a pocket for one of the rollers having respective surfaces opposite each other that face toward each other and toward the roller in the pocket;

at the surface of both of the arms in a pocket in the axial region generally adjoining the large side ring of the cage, the facing surfaces in that region being adapted to the profile of the roller in that in every cylindrically shaped sectional plane through the bearing, and therefore through the rollers of the bearing, and the sectional plane being parallel to the axis of the bearing, the facing surfaces being shaped so that the distance apart of the surfaces in the pocket is approximately the length of a chord of the roller in that cylindrical sectional plane in the region of the largest diameter of the roller.

11. The bearing of claim 10, wherein the large side ring includes an approximately radially inwardly directed projection for extending radially inwardly over the inner ring of the bearing.

12. The bearing of claim 11, wherein the inner ring includes a lip disposed axially outward of the rollers and radially inward of the large side ring of the cage.

13. The bearing of claim 12, wherein the inner ring lip includes an obliquely inclined surface, inclined axially outwardly of the rollers gradually radially inwardly from the large side ring of the cage and the projection from the large side ring extending over the obliquely inclined surface of the inner ring.

* * * * *